(12) United States Patent
Kunal et al.

(10) Patent No.: US 10,059,079 B2
(45) Date of Patent: Aug. 28, 2018

(54) DEEP DRAW COMPOSITES AND METHODS OF USING THEM

(75) Inventors: Kumar Kunal, Lynchburg, VA (US); Thomas Arnold Ebeling, Forest, VA (US); Jesse Guy Hipwell, Grand Blanc, MI (US); Erich James Vorenkamp, Pinckney, MI (US)

(73) Assignee: Hanwha Azdel, Inc., Forest, VA (US)

( * ) Notice: Subject to any disclaimer, the term of this patent is extended or adjusted under 35 U.S.C. 154(b) by 786 days.

(21) Appl. No.: 13/543,808

(22) Filed: Jul. 7, 2012

(65) Prior Publication Data

US 2013/0101822 A1  Apr. 25, 2013

Related U.S. Application Data

(60) Provisional application No. 61/550,603, filed on Oct. 24, 2011.

(51) Int. Cl.
  *B32B 27/02* (2006.01)
  *B32B 17/02* (2006.01)
  (Continued)

(52) U.S. Cl.
  CPC .............. *B32B 5/145* (2013.01); *B32B 3/26* (2013.01); *B32B 3/266* (2013.01); *B32B 5/022* (2013.01); *B32B 5/026* (2013.01); *B32B 5/18* (2013.01); *B32B 5/245* (2013.01); *B32B 5/26* (2013.01); *B32B 25/16* (2013.01); *B32B 27/12* (2013.01); *B32B 27/28* (2013.01); *B32B 27/281* (2013.01);
  (Continued)

(58) Field of Classification Search
  CPC ... D04H 1/42; D04H 3/16; D04H 1/54; E04C 2/043; A61F 13/534; C08J 7/047; C08J 7/04; C08J 2323/02; C08J 2367/022; C08J 2367/02; C08J 5/18; C08J 2375/04; B32B 27/00; B32B 5/18; B32B 27/32; B32B 3/28; B32B 5/02; B29C 44/12
  USPC ........ 428/98, 219, 317.9, 339, 341; 442/394
  See application file for complete search history.

(56) References Cited

U.S. PATENT DOCUMENTS 3,620,906 A * 11/1971 Hannes .................. B29C 70/00
                                                                 156/222
4,469,543 A *  9/1984 Segal et al. ................... 156/283
(Continued)

FOREIGN PATENT DOCUMENTS

EP         1844927      10/2007
JP         H0125707 A    1/1989
(Continued)

OTHER PUBLICATIONS

ISR/WO for PCTUS201245869 mailed Nov. 20, 2012.
Extended European Search Report for EP 12843731.6.
English translation of first Office Action for JP 2014-538784.

*Primary Examiner* — Tahseen N Khan
(74) *Attorney, Agent, or Firm* — Rhodes IP PLC; Christopher R Rhodes (57) ABSTRACT

Certain embodiments described herein are directed to composite materials effective for use in deep draw processes. In some examples, the composites can be used to provide vehicle panels such as, for example, vehicle underbody panels. In some configurations, the composite comprises a fiber reinforced polymer core and a skin material disposed on at least some portion of the fiber reinforced polymer core, in which the skin material comprises a basis weight of at least 65 g/m2 and an elongation at break of at least 20%.

13 Claims, 5 Drawing Sheets

(51) Int. Cl.
*B32B 18/00* (2006.01)
*B32B 5/02* (2006.01)
*B32B 3/00* (2006.01)
*B32B 5/14* (2006.01)
*B32B 3/26* (2006.01)
*B32B 5/26* (2006.01)
*B32B 25/16* (2006.01)
*B32B 27/12* (2006.01)
*B32B 27/28* (2006.01)
*B32B 27/30* (2006.01)
*B32B 27/32* (2006.01)
*B32B 27/34* (2006.01)
*B32B 27/36* (2006.01)
*B32B 27/40* (2006.01)
*B32B 5/18* (2006.01)
*B32B 5/24* (2006.01)

(52) U.S. Cl.
CPC ............ *B32B 27/285* (2013.01); *B32B 27/30* (2013.01); *B32B 27/302* (2013.01); *B32B 27/308* (2013.01); *B32B 27/32* (2013.01); *B32B 27/34* (2013.01); *B32B 27/365* (2013.01); *B32B 27/40* (2013.01); *B32B 2250/40* (2013.01); *B32B 2262/02* (2013.01); *B32B 2262/101* (2013.01); *B32B 2262/105* (2013.01); *B32B 2262/106* (2013.01); *B32B 2270/00* (2013.01); *B32B 2274/00* (2013.01); *B32B 2307/50* (2013.01); *B32B 2307/54* (2013.01); *B32B 2307/718* (2013.01); *B32B 2605/00* (2013.01); *B32B 2605/08* (2013.01); *Y02B 10/30* (2013.01); *Y10T 428/24* (2015.01); *Y10T 428/249986* (2015.04); *Y10T 428/269* (2015.01); *Y10T 428/273* (2015.01); *Y10T 442/674* (2015.04)

(56) References Cited

U.S. PATENT DOCUMENTS

| | | |
|---|---|---|
| 4,840,826 A | 6/1989 | Shirasaki |
| 2001/0009828 A1 | 7/2001 | Himmelsbach |
| 2002/0094742 A1* | 7/2002 | Jones ................ B32B 27/12 442/394 |
| 2003/0026967 A1* | 2/2003 | Joseph et al. ............ 428/292.1 |
| 2003/0153226 A1* | 8/2003 | Jones ................ B32B 27/12 442/76 |
| 2004/0043680 A1 | 3/2004 | Mead |
| 2004/0231915 A1* | 11/2004 | Thompson, Jr. ......... B32B 5/02 181/290 |
| 2005/0192365 A1* | 9/2005 | Strandburg ............. C08J 9/30 521/50 |
| 2006/0099393 A1* | 5/2006 | Woodman et al. ........ 428/292.1 |
| 2007/0238378 A1 | 10/2007 | Conover |
| 2007/0269645 A1 | 11/2007 | Raghavendran |
| 2007/0293108 A1 | 12/2007 | Kubota |
| 2008/0008869 A1 | 1/2008 | Good |
| 2010/0040902 A1 | 2/2010 | Mizrahi |
| 2010/0055384 A1 | 3/2010 | Doecker |

FOREIGN PATENT DOCUMENTS

| | | |
|---|---|---|
| JP | H0524058 A | 2/1993 |
| JP | 3001450 | 6/1994 |
| JP | H06182945 A | 7/1994 |
| JP | 2002240566 A | 8/2002 |
| JP | 2006285086 A | 10/2006 |
| JP | 2011104947 A | 6/2011 |
| WO | 2005097879 | 10/2005 |
| WO | 2005100708 | 10/2005 |
| WO | 2006052967 | 5/2006 |

\* cited by examiner

DEEP DRAW COMPOSITES AND METHODS OF USING THEM

PRIORITY APPLICATION

This application claims priority to, and the benefit of, U.S. Provisional Application No. 61/550,603 filed on Oct. 24, 2011, the entire disclosure of which is hereby incorporated herein by reference for all purposes.

TECHNOLOGICAL FIELD

This application is related to deep draw composites. In particular, certain embodiments described herein are directed to composites comprising one or more fabrics, e.g., a non-woven fabric, effective to permit deep drawing of the composite.

BACKGROUND

Articles for automotive and construction materials applications typically are designed to meet a number of competing and stringent performance specifications.

SUMMARY

In a first aspect, a composite material comprising a fiber reinforced polymer core and a skin material disposed on at least some portion of the fiber reinforced polymer core, in which the skin material comprises a basis weight of at least 65 g/m2 and an elongation at break of at least 20% is provided. In some embodiments, the core may comprise a porosity of greater than 0% to about 95% by volume of the polymer core material.

In certain embodiments, the skin material and the fiber reinforced polymer core can be bonded together. In some examples, the fiber reinforced polymer core comprises fibers disposed within a polymer resin. In other examples, the skin material comprises a porous non-woven material comprising the basis weight of at least 65 g/m2 and the elongation at break of at least 20%. In additional examples, the skin material can be disposed on an entire planar surface of the polymer core. In further examples, the skin material can be disposed as a strip on a surface of the polymer core. In some examples, the composite can be constructed and arranged as a vehicular panel. In certain embodiments, the composite can be constructed and arranged as a vehicular underbody panel. In some examples, the composite can be structured and arranged as an exterior automotive part. In further examples, the composite can be structured and arranged as an interior automotive part. In other embodiments, the interior automotive part can be a headliner. In further examples, the composite comprises a basis weight of less than about 3000 g/m2. In certain embodiments, the fiber reinforced polymer core comprises a porosity between about 20% to about 80% by volume of the core. In other embodiments, the fiber reinforced polymer core comprises a porosity between about 30% to about 70% by volume of the core. In some examples, the fiber content of the fiber reinforced polymer core is from about 20 wt. % to about 80 wt. % of the polymer resin. In certain examples, fibers dispersed within the polymer resin comprise fibers including a diameter greater than about 5 microns and a length from about 5 mm to about 200 mm. In other examples, the polymer resin can be selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof. In some examples, the fibers of the core are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In certain examples, the composite can include an additional skin material disposed on the polymer core.

In another aspect, a composite comprising a fiber reinforced polymer core and a skin material disposed on the fiber reinforced polymer core, the skin material comprising a basis weight of at least 65 g/m2 and an elongation at break of at least 20%, in which the composite is effective to permit deep drawing of the composite by at least 5 cm using a torture tool test method without breakthrough of the composite is described.

In certain embodiments, the skin material can be selected from the group consisting of a fabric, a film and combinations thereof. In other embodiments, the skin material can be selected from the group consisting of a porous non-woven material, a porous knit material, and combinations thereof. In further embodiments, the composite comprises a basis weight of less than about 3000 g/m2. In some examples, the fiber reinforced polymer core comprises a porosity between about 20% to about 80% by volume of the core. In certain examples, the fiber reinforced polymer core comprises a porosity between about 30% to about 70% by volume of the core. In other examples, the fiber reinforced polymer core comprises fibers disposed within a polymer resin. In some embodiments, the fiber content of the fiber reinforced polymer core is from about 20 wt. % to about 80 wt. % of the polymer resin. In other embodiments, fibers dispersed within the polymer resin comprise fibers having a diameter greater than about 5 microns and a length from about 5 mm to about 200 mm. In certain embodiments, the polymer resin can be selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof.

In an additional aspect, a pre-molded composite comprising a fiber reinforced polymer core effective to melt during molding and a skin material disposed on the fiber reinforced polymer core, the skin material comprising a basis weight of at least 65 g/m2 and an elongation at break of at least 20% is disclosed.

In certain examples, the composite is effective to permit deep drawing of the composite by at least 5 cm using a torture tool test method without breakthrough of the composite. In certain embodiments, the skin material can be selected from the group consisting of a fabric, a film and combinations thereof. In other embodiments, the skin material can be selected from the group consisting of a porous non-woven material, a porous knit material, and combinations thereof. In further embodiments, the composite comprises a basis weight of less than about 3000 g/m2. In certain examples, the fiber reinforced polymer core comprises a porosity between about 20% to about 80% by volume of the core. In some examples, the fiber reinforced polymer core comprises fibers disposed within a polymer resin. In further examples, the fiber content of the fiber reinforced polymer core is from about 20 wt. % to about 80 wt. % of the polymer resin. In some embodiments, the fibers dispersed within the polymer resin comprise fibers having a diameter greater than about 5 microns and a length from about 5 mm to about 200 mm. In further embodiments, the polymer resin can be selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof.

In another aspect, a molded composite comprising a fiber reinforced polymer core effective and a skin material disposed on the fiber reinforced polymer core, the skin material comprising a basis weight of at least 65 g/m2 and an elongation at break of at least 20%, the molded composite material being formed from a deep draw molding process is provided.

In certain embodiments, the molded composite comprises areas deeper than about 5 cm that were formed from the deep draw molding process. In some embodiments, the skin material of the molded composite can be selected from the group consisting of a fabric, a film and combinations thereof. In other embodiments, the skin material of the molded composite can be selected from the group consisting of a porous non-woven material, a porous knit material, and combinations thereof. In further embodiments, the molded composite comprises a basis weight of less than about 3000 g/m2. In certain examples, the molded composite comprises a fiber reinforced polymer core comprising a porosity between about 20% to about 80% by volume of the core. In additional examples, the molded composite comprises fibers disposed within a polymer resin to provide its core. In some examples, the fiber content of the fiber reinforced polymer core is from about 20 wt. % to about 80 wt. % of the polymer resin. In further examples, the fibers dispersed within the polymer resin comprise fibers having a diameter greater than about 5 microns and a length from about 5 mm to about 200 mm. In additional examples, the polymer resin of the molded composite can be selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof.

In an additional aspect, a fiber reinforced composite formed from a fiber reinforced polymer core material comprising a polymer resin and fibers dispersed within the polymer resin, wherein, the fiber reinforced polymer core material has a porosity of greater than 0% to about 95% by volume of the polymer core material, and a porous non-woven skin material applied to one or both sides of the polymer material, having a basis weight of at least 65 g/m2 and an elongation at break of at least 20%, and wherein the skin material and the polymer core material are bonded together is described.

In certain embodiments, the composite is in the form of a vehicular panel. In other embodiments, the composite is a vehicular underbody panel, an interior or exterior automotive part, or an automotive headliner. In some embodiments, the composite is a panel selected from an underbody panel, a recreational vehicle panel, a motor vehicle body panel, a motor vehicle wall panel, a recreational vehicle wall or floor panel, or a motor home sidewall panel. In certain examples, the composite comprises a basis weight of less than 3000 g/m2. In other examples, the fiber reinforced polymer core material has a porosity between about 20% to about 80% by volume of the thermoplastic material. In some examples, the fiber reinforced polymer core material has a porosity between about 30% to about 70% by volume of the thermoplastic material. In other examples, the fiber content of the fiber reinforced polymer core material is from about 20 wt. % to about 80 wt. % of the polymer resin. In certain embodiments, the fibers dispersed within the polymer resin comprise fibers having a diameter greater than about 5 microns and a length from about 5 mm to about 200 mm. In some embodiments, the polymer resin can be selected from the group consisting of polyolefins, thermoplastic polyolefin blends, polyvinyl polymers, butadiene polymers, acrylic polymers, polyamides, polyesters, polycarbonates, polyestercarbonates, polystyrenes, acrylonitrylstyrene polymers, acrylonitrile-butylacrylate-styrene polymers, polyether imide, polyphenylene ether, polyphenylene oxide, polyphenylenesulphide, polyethers, polyetherketones, polyacetals, polyurethanes, polybenzimidazole, and copolymers and mixtures thereof. In certain examples, the fibers are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In other examples, the polymer material is prepared by a method comprising adding reinforcing fibers and a polymer resin to an agitated liquid-containing foam to form a dispersed mixture of polymer resin and reinforcing fibers, depositing the dispersed mixture of reinforcing fibers and polymer resin onto a forming support element, evacuating the liquid to form a web, heating the web above the softening temperature of the polymer resin; and compressing the web to a predetermined thickness to form the polymer material.

In some examples, the skin material of the composites described herein comprises a polymer resin selected from resins based on polyolefins, thermoplastic polyolefin blends, polyvinyl polymers, butadiene polymers, acrylic polymers, polyamides, polyesters, polycarbonates, polyestercarbonates, polystyrenes, acrylonitrylstyrene polymers, acrylonitrile-butylacrylate-styrene polymers, polyether imide, polyphenylene ether, polyphenylene oxide, polyphenylenesulphide, polyethers, polyetherketones, polyacetals, polyurethanes, polybenzimidazole, and copolymers and mixtures thereof. In certain examples, the skin material further comprises fibers selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In other examples, the skin material and the polymer core material are bonded together by an adhesive between the skin material and the polymer core material. In further examples, the adhesive is a continuous adhesive film or scattered adhesive particles, and wherein the adhesive comprises at least one component that is capable of bonding to the polymer core material and at least one component that is capable of bonding to the skin material. In some embodiments, the skin material is produced using a method selected from the group consisting of needle-punch, hydroentanglement, spin-bonding, thermal-bonding, and combinations thereof. In further embodiments, the porous non-woven skin material can be a fabric. In other embodiments, the porous non-woven skin material can be a film. In some examples, the composite can include an intermediate layer disposed between the polymer core and the non-woven skin material.

In another aspect, a method comprising adding reinforcing fibers and a polymer resin to an agitated liquid-containing foam to form a dispersed mixture of polymer resin and reinforcing fibers, depositing the dispersed mixture of reinforcing fibers and polymer resin onto a forming support element, evacuating the liquid to form a web, heating the web above the softening temperature of the polymer resin, compressing the web to a predetermined thickness to form the polymer material, and disposing a skin material on the compressed web is described.

In an additional aspect, a method comprising adding reinforcing fibers and a polymer resin to an agitated liquid-containing foam to form a dispersed mixture of polymer resin and reinforcing fibers, depositing the dispersed mixture of reinforcing fibers and polymer resin onto a forming support element, evacuating the liquid to form a web, disposing a skin material on the web, heating the web and disposed skin material above the softening temperature of the polymer resin, and compressing the web and disposed skin material to a predetermined thickness to form the polymer material is disclosed.

In another aspect, a method of facilitating formation of a vehicular part, the method comprising providing a composite material comprising a fiber reinforced polymer core and a skin material disposed on at least some portion of the fiber reinforced polymer core, the skin material comprises a basis weight of at least 65 g/m2 and an elongation at break of at least 20% is provided. In certain examples, the skin material comprises a porous non-woven material.

In an additional aspect, a method of facilitating formation of a vehicular part, the method comprising providing a composite comprising a fiber reinforced polymer core and a skin material disposed on the fiber reinforced polymer core, the skin material comprising a basis weight of at least 65 g/m2 and an elongation at break of at least 20%, in which the composite is effective to permit deep drawing of the composite by at least 5 cm using a torture tool test method without breakthrough of the composite is described. In certain examples, the skin material comprises a porous non-woven material.

In another aspect, a method of facilitating formation of a vehicular part, the method comprising providing a pre-molded composite comprising a fiber reinforced polymer core effective to melt during molding and a skin material disposed on the fiber reinforced polymer core, the skin material comprising a basis weight of at least 65 g/m2 and an elongation at break of at least 20% is disclosed. In certain examples, the skin material comprises a porous non-woven material.

In an additional aspect, a method of facilitating assembly of a vehicle, the method comprising providing a molded composite comprising a fiber reinforced polymer core effective and a skin material disposed on the fiber reinforced polymer core, the skin material comprising a basis weight of at least 65 g/m2 and an elongation at break of at least 20%, the molded composite material being formed from a deep draw molding process is described. In certain examples, the skin material comprises a porous non-woven material.

In another aspect, a method of facilitating formation of a vehicular part, the method comprising providing a fiber reinforced composite formed from a fiber reinforced polymer core material comprising a polymer resin and fibers dispersed within the polymer resin, wherein the fiber reinforced polymer core material has a porosity of greater than 0% to about 95% by volume of the polymer core material, and a porous non-woven skin material applied to one or both sides of the polymer material, having a basis weight of at least 65 g/m2 and an elongation at break of at least 20%, and wherein the skin material and the polymer core material are bonded together is disclosed.

Additional features, aspect, examples and embodiments are described in more detail below.

BRIEF DESCRIPTION OF THE FIGURES

Certain embodiments are described with reference to the accompanying figures in which.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. No particular thickness, width or length is intended by the depictions in the figures, and relative sizes of the figure components are not intended to limit the sizes of any of the components in the figures. Where dimensions or values are specified in the description below, the dimensions or values are provided for illustrative purposes only. In addition, no particular material or arrangement is intended to be required by virtue of shading of certain portions of the figures, and even though different components in the figures may include shading for purposes of distinction, the different components can include the same or similar material, if desired.

DETAILED DESCRIPTION

Certain embodiments are described below with reference to singular and plural terms in order to provide a user friendly description of the technology disclosed herein. These terms are used for convenience purposes only and are not intended to limit the articles as including or excluding certain features unless otherwise noted as being present in a particular embodiment described herein.

In certain embodiments, the articles described herein can include a core material with one or more surface layers disposed on the core material on at least some portion. In some embodiments, the skin layer can be a fabric material. For example, the skin layer can be a spunbond non-woven material, a needle-punch material, a hydroentangled material, a spunlaid material or combinations of two or more of these materials. In certain examples, the material may include zones or areas with one or more of these materials with different zones having different materials. In other examples, the surface layer may be a material effective to be thermally bonded to the core, thermochemically bonded to the core or thermomechanically bonded to the core. Specific examples of suitable materials are described in more detail below.

In other embodiments, the surface layer can be a film. Illustrative films include, but are not limited to, a thermoplastic film, a thermoplastic elastomer film, a fiber-reinforced film and similar materials. If desired the films can include one or more thermoset materials either in the film or as a separate layer on the film, e.g., between the core and the film or between the film and another material. In some embodiments, the core may have two or more materials disposed thereon, which may be the same or may be different. For example, a porous, non-woven material can be disposed on one side of the core material and a film can then be disposed on the porous, non-woven material. In an alternative configuration, a film can first be disposed on the core and a porous, non-woven material can then be disposed on the film. Depending on the desired properties of the article, it may be desirable to first dispose the non-woven material on the core and then dispose the film on the core.

In certain embodiments, the surface layer can be formed onto the core material or the core material can be disposed onto the surface layer to provide an article. The exact ordering of the steps may vary depending on the materials and the processing conditions. It may be desirable to use an integrated process where the core is formed onto the surface layer to provide better bonding between the core and the surface layer.

The surface layers described herein are commercially available from many different suppliers including, but not limited to, HOF Textiles (Lincolnton, N.C.), Freudenberg Nonwovens (Durham, N.C.), Condako Bvba (Belgium), Ahlstrom (Alpharetta, Ga.), Mondi (Belgium) and others. Prior to use, the surface layers can be processed, trimmed, washed, perforated or other processing steps can be performed.

In certain embodiments, the composite described herein may be uniform in thickness or have areas or zones of variable thickness relative to other areas of the composite. It may be desirable to provide thicker zones in certain areas, e.g., in areas of the deep draw composite that are relatively flat, whereas thinner sections may be desirable for areas that are to be subjected to deep drawing or other processes that can alter the depth of the composite.

In certain examples described herein, composite materials have been developed that provide enhanced formability. Such composites can provide a number of attributes, e.g., they can be molded and formed into a variety of suitable structural and non-structural articles, including, but not limited to, an automotive structural component such as, for example, a bumper, an interior headliner, a underbody shield, a fender liner, a fender flare, a skid plate, a crossmember, a dashboard, and interior and exterior trim parts. In other examples, the composites can be used as, or can be part of, a building panel, an acoustic panel, a vehicle panel, a lightweight structural member such as those present in a recreational vehicle, a wind turbine blade, a wind turbine housing, a photovoltaic cell panel backing, or other applications where it may be desirable to use or include lightweight materials that can provide enhanced formability.

In certain embodiments, traditional glass fiber composites used in exterior structural applications can be generally compression flow molded and can be substantially void free in their final part shape. By comparison, low density glass fiber composites used in automotive interior applications can be generally semi-structural in nature and are porous and lightweight with densities ranging from 0.1 to 1.8 g/cm$^3$ and containing 5% to 95% voids distributed uniformly through the thickness of the finished part. Certain automotive specifications desire light weight, good flexural, impact, and other mechanical properties, as well as good thermoformability characteristics and/or improved mechanical properties.

In certain examples described herein, a composite comprises a core comprising one or more polymer materials. In some embodiments, the polymer material of the core may be or may comprise a thermoplastic material such as, for example, the illustrative thermoplastic materials described herein. If desired, the core can comprise reinforcing materials such as, for example, fibers, whiskers, powders, particles, cross-linkable materials, or other materials that can increase the overall strength or impart a desired mechanical property to the core material. Where reinforcing materials are present, they can be present in a continuous or discontinuous form, homogenously throughout the core or localized or otherwise present in larger amounts in some areas compared to other areas. In embodiments where the reinforcing materials are fibers, the fibers can be arranged parallel to each other, orthogonal to each other or present in no particular angular orientation depending on the desired properties of the core material.

In certain embodiments, an outer material or skin can be disposed or otherwise present on one or both sides of the core material or select areas or portions thereof. The term "skin" is used broadly and intended to include layers, fabrics, films and other materials that can be formed on the core material or can be pre-formed and subsequently disposed on the core material or select areas or portions thereof. In certain examples, the skin used is effective to provide an article capable of being subjected to a deep draw process to provide a formed article without breakthrough. For example, in some configurations, the article comprising the skin can be deep drawn by at least 5 cm deep, more particularly about 6 cm deep, e.g., 5.5 cm, 6.5 cm or greater than 7 cm deep without breakthrough. In some embodiments, a deep draw molding processes can be any molding process where the mold provides a resulting structure having at least one area that is depressed (or raised depending on the viewing angle)

of at least 5 cm. Elongation of the skins can also be measured according to various tests including, but not limited to, test commonly used to measure elongation of fabrics, e.g., ASTM 5034 published February 2009 and ASTM 5035 dated October 2008, the entire disclosure of each of which is hereby incorporated herein by reference. In certain configurations, the composite comprises a core formed from one or more polymers (typically a polymer resin such as a thermoplastic resin) and discontinuous fibers dispersed within the polymer(s). One or more skin material layers comprising one or more non-woven materials can be disposed on one or more of the surfaces of the polymer core material. As described herein, the composite can be formed into various types of articles, e.g., automotive components, such as interior components and exterior body panels, particularly underbody panels, as well as other articles noted herein and other suitable articles that will be selected by the person of ordinary skill in the art, given the benefit of this disclosure. In certain embodiments, the composite may provide an improved combination of thermoformability and mechanical properties compared to other known fiber reinforced thermoplastic composites.

In certain examples, the composite can provide improved mechanical properties including improved peel strength, improved elongation at break or other suitable mechanical properties which are improved in the composite. For example, the adhesive peel strength of the composite may be greater than about 3.5 N, more particularly greater than about 4N (as measured according to DIN 419 published Jul. 3, 1990). While not required, more than a single mechanical property can be improved by using one or more of the composites described herein, e.g., thermoformability and/or mechanical characteristics of the composite noted herein may be improved individually or in any combination with each other.

In certain embodiments, the composite can be porous, non-porous or includes areas which are porous while comprising other areas which are non-porous. The exact porosity present in the composite can vary depending on the intended use of the composite. In certain embodiments, the polymer core can comprise a porosity greater than 0% by volume of the polymer core, more particularly between greater than 0% to about 95% by volume of the polymer core, and still more particularly between about 30% to about 70% by volume of the polymer core. While not required, it is also possible that the overall composite, which includes the polymer core, is non-porous or has a porosity within the aforementioned ranges, e.g., the porosity of the composite may generally be greater than 0% to about 95% of the total volume of the composite, more particularly between greater than 0% to about 95% by the total volume of the composite, and still more particularly between about 30% to about 70% by the total volume of the composite. In yet other examples, the core or the overall composite may comprise a porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. If desired the porosity of the core or the overall composite may be greater than 95%, e.g., may be about 96% or 97%.

In certain examples, the composite typically includes a polymer material that can function as an adhesive, binder, resin or is otherwise effective to impart desired properties to the composite. In some embodiments, the polymer material can be, or can include, a polymer resin or a polymer rosin. In embodiments where a polymer resin is used, the polymer resin can be a material comprising a melt temperature below the polymer degradation temperature. Illustrative types of polymer resins, include but are not limited to, a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyimide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers, mixtures and combinations thereof. In some embodiments, the polymeric material can include two polymer resins, three polymer resins, four polymer resins or more. In other examples, different portions of the composite can include different polymer material compositions. For example, a first area of the composite can include a first polymer resin, and a second area of the composite can include a second polymer resin different from the first polymer resin. Other thermoplastic polymers may also be used that can be sufficiently softened by heat or other radiation to permit fusing and/or molding without being chemically or thermally decomposed (to any substantial degree) during processing or formation of the composite material. Such other suitable thermoplastic polymers will be readily selected by the person of ordinary skill in the art, given the benefit of this disclosure.

In certain examples, the composite can include one or more suitable types of reinforcing materials to impart a desired strength and/or mechanical properties to the composite. In some embodiments, the reinforcing materials can be one or more types of fibers. Illustrative types of fibers include, but are not limited to, glass fibers, carbon fibers, graphite fibers, synthetic organic fibers, particularly high modulus organic fibers such as, for example, para- and meta-aramid fibers, nylon fibers, polyester fibers, or any of the thermoplastic resins mentioned above that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. The fiber content in the polymer core may be from about 20% to about 80%, more particularly from about 30% to about 60%, by weight of the polymer core. Typically, the fiber content of the composite varies between about 20% to about 80% by weight, more particularly between about 40% to about 70% by weight of the composite. The particular size and/or orientation of the fibers used may depend, at least in part, on the polymer material used and/or the desired properties of the resulting composite. Suitable additional types of fibers, fiber sizes and amounts will be readily selected by the person of ordinary skill in the art, given the benefit of this disclosure. In one non-limiting illustration, fibers dispersed within a polymer resin, forming the polymer core material of the composite, for example, generally have a diameter of greater than about 5 microns, more particularly from about 5 microns to about 22 microns, and a length of from about 5 mm to about 200 mm; more particularly, the fiber diameter may be from about microns to about 22 microns and the fiber length may be from about 5 mm to about 75 mm.

In certain examples where the composite comprises a non-woven material, the non-woven material may be generally any suitable non-woven material that permits deep draw processed to be performed on the composite without breakthrough. In some embodiments, the non-woven skin may comprise a basis weight of greater than about 65 g/m2 and an elongation at break equal to or greater than 20% (measured according to ASTM D5034 (grab) test dated February 2009 or ASTM D5035 (strip) tensile test dated October 2008). Without wishing to be bound by any particular scientific theory, during processing, the non-woven skin material can bond to the polymer core by fusion with the polymer component of the composite, optionally through the use of an adhesive(s), to provide sufficient bond strength between the core and the skin material in order to prevent delamination during thermoforming. In some examples, the adhesive may be in the form of a layer, such as a film, coating, or other type of layer applied to the core and/or the skin material, whereas in other examples, adhesive may be disposed intermittently between the non-woven skin and the core. If desired, scattered particles between the core and the skin material can be present, and, the particles may, but are not required to, provide adhesion (or additional adhesion) between the core and the skin material.

In certain embodiments, the composite can be produced using numerous methods. For example, the composite may generally be prepared in various forms, such as sheets or films, as layered materials on pre-formed substrates, or in other more rigid forms depending on the particular application desired. For certain applications, the composite can be provided in sheet form and may optionally include, in addition to the non-woven skin material, one or more additional layers on one or both surfaces of such sheet. In one illustration, such surface or skin layers may be, for example, a film, non-woven scrim, a veil, a woven fabric, or combinations thereof. If desired, the skin material or the surface or additional skin layer may be air permeable and can substantially stretch and spread with the fiber-containing composite sheet during thermoforming and/or molding operations. In addition, such layers may be adhesive, such as a thermoplastic material (e.g., an ethylene acrylic acid copolymer or other such polymers) applied to the surface of the fiber-containing thermoplastic material. Generally, the areal density of the composite material, particularly when in sheet form, varies from about 400 g/m2 to about 4000 g/m2, more particularly about 600 g/m2 to about 3000 g/m2, e.g., about 750 g/m2 to about 2500 g/m2.

In certain embodiments, the composite materials described herein can be used to provide intermediate and final form articles, including construction articles or articles for use in automotive and other applications including, but not limited to, underbody panels, a parcel shelf, package tray, headliner, door module, instrument panel topper, body and hood panels, side wall panels such as for recreational vehicles, cargo liners, front and/or rear pillar trim, a sunshade, and the like. Other such articles will be apparent to the skilled artisan. The composite material can be molded into various articles using numerous methods including, but not limited to, pressure forming, thermal forming, thermal stamping, vacuum forming, compression forming, and autoclaving. Illustrative methods are described, for example, in U.S. Pat. Nos. 6,923,494 and 5,601,679, and in DuBois and Pribble's "Plastics Mold Engineering Handbook", Fifth Edition, 1995, pages 468 to 498 and elsewhere.

In certain embodiments, the composite described herein can comprise a low density glass mat thermoplastic composite (GMT). One such mat is prepared by AZDEL, Inc. and sold under the trademark SUPERLITE® mat. Preferably, the areal density of such a GMT is from about 400 grams per square meter of the GMT (g/m2) to about 4000 g/m2, although the areal density may be less than 400 g/m2 or greater than 4000 g/m2 depending on the specific application needs. Preferably, the upper density should be less than about 4000 g/m2. The SUPERLITE® mat can be generally prepared using chopped glass fibers, a thermoplastic resin and a thermoplastic polymer film or films and or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. Generally, PP, PBT, PET, and PC/PET and PC/PBT blends are the desired thermoplastic resins. To produce the low density GMT, the materials and other additives can be metered into a dispersing foam contained in an open top mixing tank fitted with an impeller. Without wishing to be bound by any particular theory, the foam can assist in dispersing the glass fibers and thermoplastic resin binder. In some examples, the dispersed mixture of glass and thermoplastic resin is pumped to a head-box located above a wire section of a paper machine via a distribution manifold. The foam, not the glass fiber or thermoplastic resin, can then be removed as the dispersed mixture passes through a moving wire screen using a vacuum, continuously producing a uniform, fibrous wet web. The wet web can be passed through a dryer to reduce moisture content and to melt the thermoplastic resin. When the hot web comes out of the dryer, a thermoplastic film may be laminated into the web by passing the web of glass fiber, thermoplastic resin and thermoplastic polymer film or films through the nip of a set of heated rollers. A non-woven and/or woven fabric layer may also be attached along with or in place thermoplastic film to one side or to both sides of the web to facilitate ease of handling the glass fiber-reinforced mat. The SUPERLITE® composite can then be passed through tension rolls and continuously cut (guillotined) into the desired size for later forming into an end product article. Further information concerning the preparation of such GMT composites, including suitable materials used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

Figure 1:
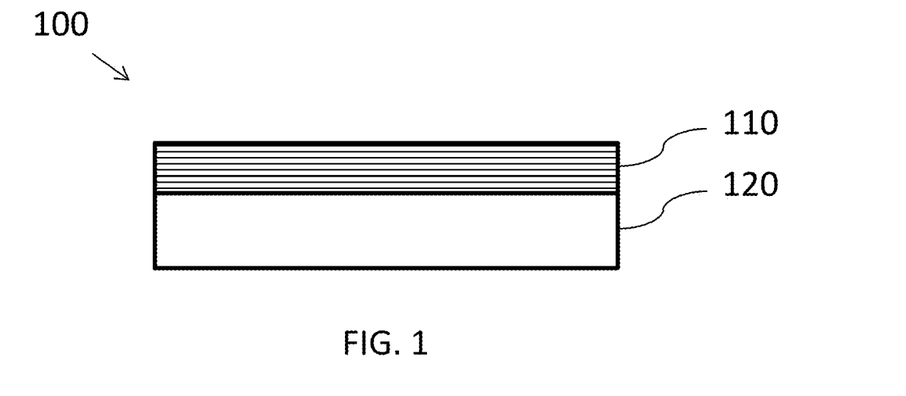
FIG. 1 is a cross-section of an illustration of a composite, in accordance with certain examples.

Certain illustrative configurations are shown in the figures. Referring now to FIG. 1, a composite 100 is shown that comprises a core 120 and a skin material 110 disposed on the core 120. The core 120 may be any one or more of those materials described herein, e.g., a GMT composite. The skin material 110 can be disposed on the core 120 subsequent to formation of the core 120, and may be laminated, bonded or otherwise attached to the core 120 in some manner. In certain embodiments, the skin material 110 can be selected to comprise a basis weight of at least 65 g/m2 and an elongation at break of at least 20%. In certain embodiments, the skin material 110 may be, or may include, a non-woven material or include areas that are non-woven. In other configurations, the skin material 110 may comprise two or more different materials. For example, the skin material 110 can include a woven material and a non-woven material.

Figure 2:
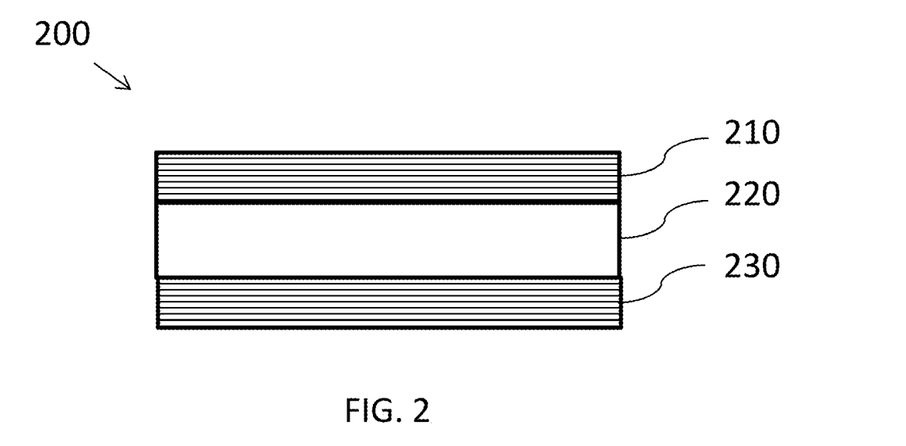
FIG. 2 is a cross-section of another illustration of a composite, in accordance with certain examples.

In certain embodiments, the composite can include a skin material disposed on each planar surface if desired. One illustration is shown in FIG. 2. The composite 200 comprises a core 220, a first skin material 210 disposed on a first planar surface of the core 220, and a second skin material 230 disposed on a second planar surface of the core 220. Each of the skin materials 210 and 230 can be disposed on the core 220 subsequent to formation of the core 120, and may be laminated, bonded or otherwise attached to the core 220 in some manner. In certain embodiments, at least one of the skin materials 210 and 230 can be selected to comprise a basis weight of at least 65 g/m2 and an elongation at break of at least 20%. In certain examples, each of the skin materials 210 and 230 can be selected to comprise a basis weight of at least 65 g/m2 and an elongation at break of at least 20%. In certain embodiments, each of the skin materials 210 and 230 may independently be, or may independently include, a non-woven material or include areas that are non-woven. In other configurations, each of the skin materials 210 and 230 may independently comprise two or more different materials. For example, the skin material 210 can include a woven material and a non-woven material, and the skin material 230 can include two different non-woven materials.

Figure 3:
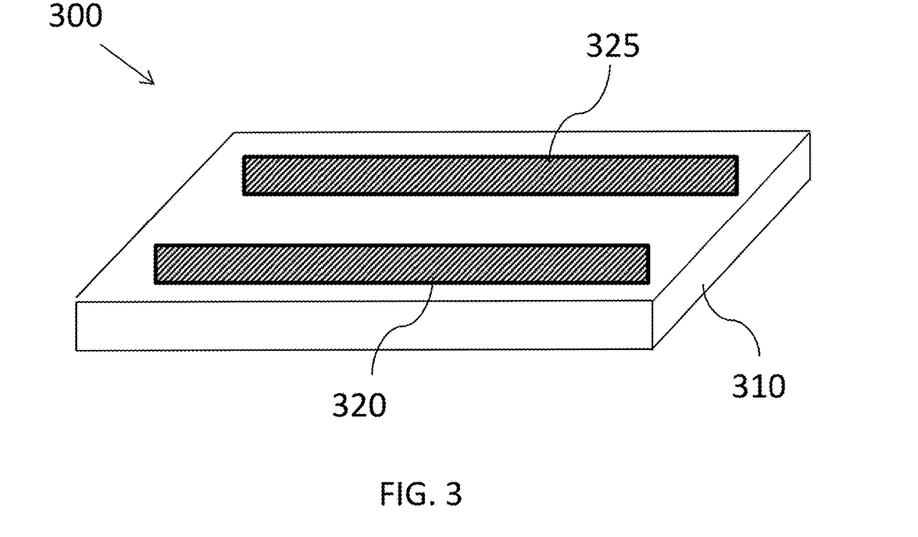
FIG. 3 is a perspective view of an illustration of a composite comprising strips of a skin material, in accordance with certain examples.

In certain examples, the skin material can be disposed on an entire surface of the core material, can be disposed intermittently on the surface or can be disposed in patches. Illustrations showing perspective views of a composite with skin materials disposed in different manners are shown in FIGS. 3-6. Referring to FIG. 3, a composite 300 comprises a core material 310 and strips of a skin material 320 and 325 disposed generally along the long axis direction of the composite 300. While not wishing to be bound by any particular scientific theory, it may be desirable to dispose the skin material in areas of the composite to be subjected to deep draw processes, whereas non-subjected areas can be left skin free. The exact dimensions, width and composition of the strips 320 and 325 can vary and typically the strips can be produced from the same materials and using the same processes as those used to produce the skins described herein. In some embodiments, at least one of the strips 320 and 325 can be selected to comprise a basis weight of at least 65 g/m2 and an elongation at break of at least 20%. In certain examples, each of the strips 320 and 325 can be selected to comprise a basis weight of at least 65 g/m2 and an elongation at break of at least 20%. The composition and dimensions of the strips 320 and 325 need not be the same. In addition, areas of each of the strips 320 and 325 may include different compositions, e.g., different fibers, different porosities, etc. In other configurations, the entire planar surface of the core can include a first non-woven skin, and strips, such as those shown in FIG. 3, can be disposed on the first non-woven skin. For example, for areas subjected to deep draw, it may be desirable to include more than a single skin material in those areas. While FIG. 3 shows a composite 300 comprising two strips 320 and 325, a plurality of strips can also be used, e.g., three, four, five, six or more separate strips can be present. In some embodiments, the strips can be applied by an end-user prior to forming of the composite into a desired structure or shape, e.g., into an automotive part such as an automotive underbody shield.

Figure 4:
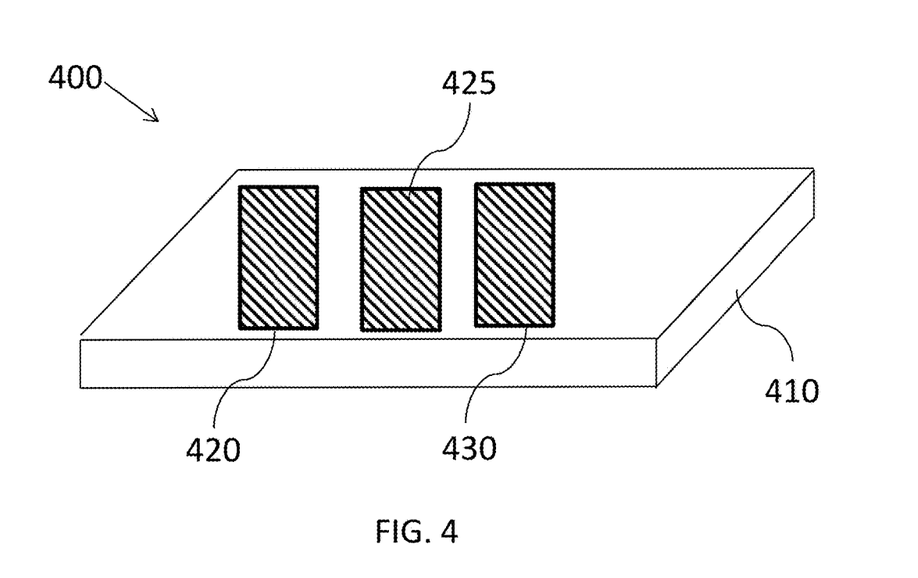
FIG. 4 is a perspective view of an illustration of another composite comprising strips of a skin material, in accordance with certain examples.

Referring now to FIG. 4, a composite 400 is shown comprising a core material 410 with a plurality of skin strips 420, 425 and 430 disposed on the core material 410 in a direction generally orthogonal to the long axis direction of the composite 400. As described herein, it may be desirable to dispose the skin material in areas of the composite to be subjected to deep draw processes, whereas non-subjected areas can be left skin free. The exact dimensions, width and composition of the strips 420, 425 and 430 can vary and typically the strips can be produced from the same materials and using the same processes as those used to produce the skins described herein. In some embodiments, at least one of the strips 420, 425 and 430 can be selected to comprise a basis weight of at least 65 g/m2 and an elongation at break of at least 20%. In certain examples, at least two of the strips 420, 425 and 430 can be selected to comprise a basis weight of at least 65 g/m2 and an elongation at break of at least 20%. In other examples, each of the strips 420, 425 and 430 can be selected to comprise a basis weight of at least 65 g/m2 and an elongation at break of at least 20%. The composition and dimensions of the strips 420, 425 and 430 need not be the same. In addition, areas of each of the strips 420, 425 and 430 may include different compositions, e.g., different fibers, different porosities, etc. In other configurations, the entire planar surface of the core can include a first non-woven skin, and strips, such as those shown in FIG. 4, can be disposed on the first non-woven skin. For example, for areas subjected to deep draw, it may be desirable to include more than a single skin material in those areas. While FIG. 4 shows a composite 400 comprising three strips 420, 425 and 430, more than three strips can be used, e.g., four, five, six or more separate strips can be present. In some embodiments, the strips can be applied by an end-user prior to forming of the composite into a desired structure or shape, e.g., into an automotive part such as an automotive underbody shield.

Figure 5:
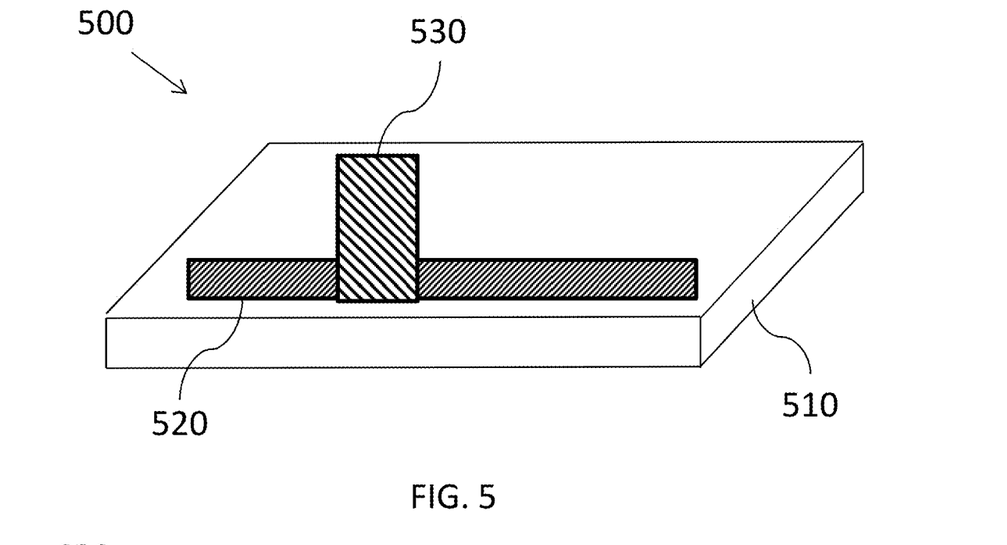
FIG. 5 is a perspective view of an illustration of a composite comprising strips of a skin material positioned in opposite directions, in accordance with certain examples.

In certain embodiments where strips are disposed on a core material, more than a single strip can be provided, and the different strips can be positioned different on the composite. Referring to FIG. 5, a composite 500 comprises a core 510, a first strip 520 of skin material disposed on the core 510, and a second strip of skin material 530 disposed on the first strip 520. The second strip 530 is disposed orthogonal to the first strip 520. In certain instances, the angle between the strips 520 and 530 need not be ninety degrees, e.g., it can be less than ninety degrees. The embodiment shown in FIG. 5 comprises the first strip 520 disposed on the core 510, but in other examples, the strip 530 can be disposed on the core 510 and the strip 520 can be disposed on the strip 530. As described herein, it may be desirable to dispose the skin material in areas of the composite to be subjected to deep draw processes, whereas non-subjected areas can be left skin free. The exact dimensions, width and composition of the strips 520 and 530 can vary and typically the strips can be produced from the same materials and using the same processes as those used to produce the skins described herein. In some embodiments, at least one of the strips 520 and 530 can be selected to comprise a basis weight of at least 65 g/m2 and an elongation at break of at least 20%. In certain examples, each of the strips 520 and 530 can be selected to comprise a basis weight of at least 65 g/m2 and an elongation at break of at least 20%. The composition and dimensions of the strips 520 and 530 need not be the same. In addition, areas of each of the strips 520 and 530 may include different compositions, e.g., different fibers, different porosities, etc. In other configurations, the entire planar surface of the core can include a first non-woven skin, and strips, such as those shown in FIG. 5, can be disposed on the first non-woven skin. For example, for areas subjected to deep draw, it may be desirable to include more than a single skin material in those areas. While FIG. 5 shows a composite 500 comprising two strips 520 and 530, a plurality of strips can also be used, e.g., three, four, five, six or more separate strips can be present. In some embodiments, the strips can be applied by an end-user prior to forming of the composite into a desired structure or shape, e.g., into an automotive part such as an automotive underbody shield.

Figure 6:
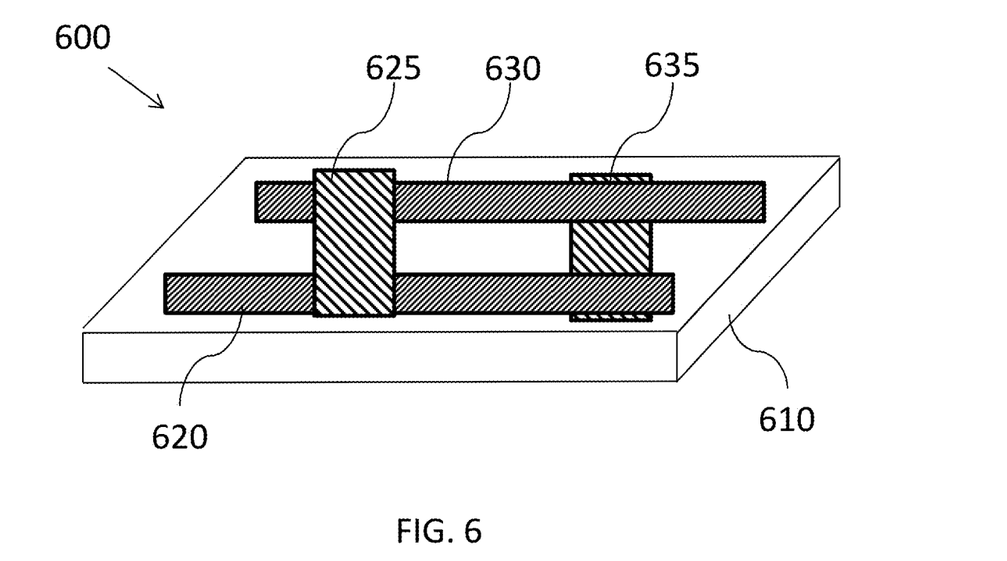
FIG. 6 is a perspective view of an illustration of a composite comprising a plurality of strips of a skin material positioned in opposite directions, in accordance with certain examples.

In certain examples where two or more strips are disposed on a core, different areas of the strips may be disposed in a different manner. Referring to FIG. 6, a composite 600 comprises a core 610 with strips 620, 625, 630 and 635 disposed on the core 610. The strip 635 is positioned in direct contact with the core 610 and under the strips 620 and 630, whereas the strip 625 is positioned on top of the strips 620 and 630. In a different configuration, the strip 635 could be positioned under the strip 630 but on top of the strip 620.

As described herein, it may be desirable to dispose the skin material in areas of the composite to be subjected to deep draw processes, whereas non-subjected areas can be left skin free. The exact dimensions, width and composition of the strips 620, 625, 630 and 635 can vary and typically the strips can be produced from the same materials and using the same processes as those used to produce the skins described herein. In some embodiments, at least one of the strips 620, 625, 630 and 635 can be selected to comprise a basis weight of at least 65 g/m2 and an elongation at break of at least 20%. In other embodiments, at least two of the strips 620, 625, 630 and 635 can be selected to comprise a basis weight of at least 65 g/m2 and an elongation at break of at least 20%. In additional embodiments, at least three of the strips 620, 625, 630 and 635 can be selected to comprise a basis weight of at least 65 g/m2 and an elongation at break of at least 20%. In certain examples, each of the strips 620, 625, 630 and 635 can be selected to comprise a basis weight of at least 65 g/m2 and an elongation at break of at least 20%. The composition and dimensions of the strips 620, 625, 630 and 635 need not be the same. In addition, areas of each of the strips 620, 625, 630 and 635 may include different compositions, e.g., different fibers, different porosities, etc. In other configurations, the entire planar surface of the core can include a first non-woven skin, and strips, such as those shown in FIG. 6, can be disposed on the first non-woven skin. For example, for areas subjected to deep draw, it may be desirable to include more than a single skin material in those areas. While FIG. 6 shows a composite 600 comprising four strips 620, 625, 630 and 635, more than four strips can also be used, e.g., five, six, seven, eight or more separate strips can be present. In some embodiments, the strips can be applied by an end-user prior to forming of the composite into a desired structure or shape, e.g., into an automotive part such as an automotive underbody shield.

Figure 7:
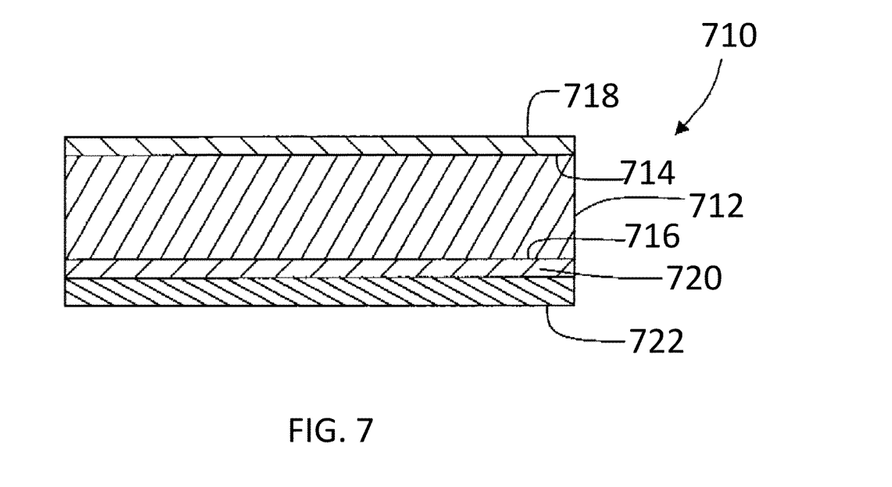
FIG. 7 is a cross-section of another illustration of a composite, in accordance with certain examples.
Figure 8:
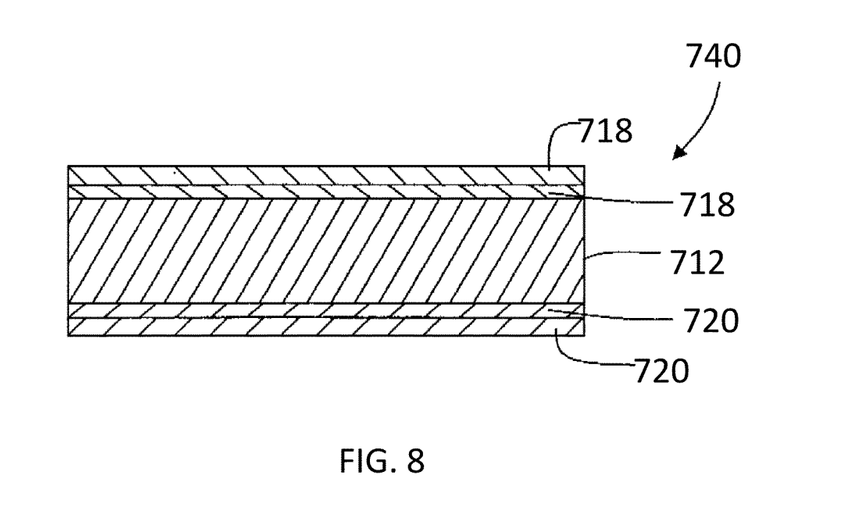
FIG. 8 is a cross-section of yet another illustration of a composite, in accordance with certain examples.

In certain embodiments, FIGS. 7 and 8 show embodiments of a lightweight thermoplastic composite. Referring to FIG. 7, the lightweight composite 710 comprises a lightweight porous polymer core 712 including a first surface 714 and a second surface 716. A first skin material 718 can be attached to first surface 714 of the core 712. A second skin material 720 can be attached to second surface 716 of the core 712. A decorative skin 722 may be bonded to second skin 720 if desired. In some embodiments, the thermoplastic composite 710 may include a decorative skin 722 bonded to first and second skin materials 718 and 720, or no decorative skins. Also, as described herein, the composite may include more than one first skin material 718 and more than one second skin material 720.

In certain examples, the polymer core 712 (and/or the cores shown in FIGS. 1-6) can be formed from a web comprising open cell structures formed by random crossing over of fibers held together, at least in part, by one or more thermoplastic resins, where the void content of the core 712 ranges in general between 0% and about 95%, more particularly greater than about 5%, and still more particularly between about 30% and about 70% of the total volume of core 712. In another configuration, the porous core 712 can comprise open cell structures formed by random crossing over of reinforcing fibers held together, at least in part, by one or more thermoplastic resins, where about 40% to about 100% of the cell structure, for example, are open and allow the flow of air and gases through. In certain examples, the core 712 has a density of about 0.1 gram/cubic centimeter (gm/cc) to about 2.25 gm/cc, more particularly about 0.1 gm/cc to about 1.8 gm/cc, and still more particularly about 0.3 gm/cc to about 1.0 gm/cc. The core 712 may be formed using known manufacturing process, for example, a wet laid process, an air or dry laid process, a dry blend process, a carding and needle process, and other processes that are employed for making non-woven products. Combinations of such manufacturing processes may also be used, and additional suitable manufacturing processes will be readily selected by the person of ordinary skill in the art, given the benefit of this disclosure.

In certain embodiments, the polymer core can include about 20% to about 80% by weight of fibers having an average length of between about 5 mm and about 200 mm, and about 20% to about 80% by weight of a wholly or substantially unconsolidated fibrous or particulate thermoplastic materials, where the weight percentages are based on the total weight of polymer core. In another embodiment, the polymer core of the composites herein includes about 30% to about 60% by weight of fibers. In some examples, fiber comprising an average length of between about 5 mm and about 25 mm are typically utilized in polymer core. Suitable fibers include, but are not limited to, metal fibers, metalized inorganic fibers, metalized synthetic fibers, glass fibers, graphite fibers, carbon fibers, ceramic fibers, mineral fibers, basalt fibers, inorganic fibers, aramid fibers, kenaf fibers, jute fibers, flax fibers, hemp fibers, cellulosic fibers, sisal fibers, coir fibers, and combinations thereof. Additional suitable fibers will be readily selected by the person of ordinary skill in the art, given the benefit of this disclosure.

In certain embodiments, fibers including an average length of about 5 mm to about 200 mm can be added with thermoplastic powder particles such as polypropylene powder, to an agitated aqueous foam. In another embodiment, reinforcing fibers including an average length of about 5 mm to about 75 mm, or more particularly, about 5 mm to about 50 mm may be used. The components can be agitated for a sufficient time to form a dispersed mixture of the reinforcing fibers and thermoplastic powder in the aqueous foam. The dispersed mixture can then be laid down on any suitable support structure, for example, a wire mesh, and then the water can be evacuated through the support structure forming a web. The web can be dried and heated above the softening temperature of the thermoplastic powder. The web can be cooled and pressed to a predetermined thickness and cooled to produce a polymer core having a porosity of greater than 0%, more particularly between about 5% to about 95% by volume.

In some embodiments, the web can be heated above the softening temperature of the thermoplastic resins in core to substantially soften the plastic materials and is passed through one or more consolidation devices, for example calendaring rolls, a laminating machine, a double belt laminator, an indexing press, a multiple daylight press, an autoclave, and other such devices used for lamination and consolidation of sheets and fabrics so that the plastic material can flow and wet out the fibers. The gap between the consolidating elements in the consolidation devices can be set to a dimension less than that of the unconsolidated web and greater than that of the web if it were to be fully consolidated, thus allowing the web to expand and remain substantially permeable after passing through the rollers. In one embodiment, the gap can be set to a dimension about 5% to about 10% greater than that of the web if it were to be fully consolidated. A fully consolidated web means a web that is fully compressed and substantially void free. A fully consolidated web would have less than about 5% void content and have negligible open cell structure.

In certain examples, particulate plastic materials may include short plastics fibers that can be included to enhance the cohesion of the web structure during manufacture. Bonding can be affected by utilizing the thermal characteristics of the plastic materials within the web structure. The web structure can be heated sufficiently to cause the thermoplastic component to fuse at its surfaces to adjacent particles and fibers. In one embodiment, the thermoplastic resin used to form the core can be, at least in part, in a particulate form. Suitable thermoplastics include any of the resins noted hereinabove, or other comparable resins that will be selected by the person of ordinary skill in the art, given the benefit of this disclosure. Generally, thermoplastic resins in particulate form need not be excessively fine.

In certain embodiments, the skins 718 and 720 may also comprise prepreg structures formed by impregnating a resin on and around aligned fibers. Various methods of forming prepregs may be utilized, including without limitation, solution processing, slurry processing, direct impregnation of a fiber tow with molten polymer, fiber co-mingling, sintering of thermoplastic powder into a fiber tow, and the like.

Fibers described above as suitable for use in making a core are also suitable in the skins 718 and 720. The fibers in the core may be the same as or different from the fibers in the skins 718 and 720. The fibers in skin 718 may also be the same as or different from the fibers in the skin 720. Even if the composition of the fibers is the same in the skins, the length or size of the fibers in the various skins may be different. Similarly, the length or size of the fibers in the skin and the core may be different even if the fiber composition is generally the same. Also, the thermoplastic resins described above as suitable for use in core layer 712 may also be used in skins 718 and 720 (or the strips described herein). The thermoplastic resin in core 712 may be the same as or different from the thermoplastic resin in skins 718 and 720. The thermoplastic resin in skin 718 may also be the same as or different from the thermoplastic resin in skin 720. Skins 718 and 720 may be attached to the core 712 during the manufacturing process of the core 712 or skins 718 and 720 can be attached prior to forming an article, for example, an automotive interior component or an automobile exterior panel. Without limitation, skins 718 and 720 can be attached to the core 712 by adhesively bonding the skin(s) to the polymer core 712. Other suitable techniques will be selected by the person of ordinary skill in the art, given the benefit of this disclosure.

In another embodiment, an article can be formed from a thermoplastic composite by heating the composite to a temperature sufficient to melt the thermoplastic resin. The heated thermoplastic composite can be then positioned in a mold, such as a matched aluminum mold, heated to about 160° F. and stamped into the desired shape using a low pressure press. The thermoplastic composite can be molded into various articles using any method known in the art including, e.g., thermal forming, thermal stamping, vacuum forming, compression forming, and autoclaving. The presence of a skin on certain embodiments described herein can permit for deep drawing of certain areas to form articles not easily achieved using different materials. In another embodiment, a decorative layer 722 can be applied to a second reinforcing skin 720 by any known technique, for example, lamination, adhesive bonding, and the like. The decorative layer 722 may be formed, e.g., from a thermoplastic film of polyvinyl chloride, polyolefins, thermoplastic polyesters, thermoplastic elastomers, or the like. Decorative layer 722 may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. Decorative layer 722 may also be made using spunbond, thermal bonded, spunlaid, meltblown, wet-laid, and/or dry-laid processes.

In certain embodiments, a composite 740 (see FIG. 8) can include two layers of the same skin disposed on the core 712. For example, two layers of a skin 718 can be disposed on one planar surface of the core 712, and two layers of a different skin 720 can be disposed on a second planar surface of the core 712. Alternatively, the skin layers can be disposed such that one skin layer 718 is disposed on a different skin layer 720. Other configurations where two or more skin layers are present will be readily selected by the person of ordinary skill in the art, given the benefit of this disclosure.

Certain embodiments described herein are effective as deep draw composites which can be drawn to desired depths in a deep draw process. One method of testing whether or not a composite is suitable as a deep draw process is referred to herein as a "torture tool test" method. In brief, a skin material can be laminated on the bare side of a core using a hot press. Temperature and pressure conditions are optimized to get sufficient bond strength between the skin and the core. The other side may have a film or a scrim covering. The above-mentioned specimen is suspended on both sides using a pin-chains assembly, and heated in an IR oven above the softening temperature of the thermoplastic resin in the core. Subsequently, the specimen in compressed in a testmold, and allowed to cool in the mold to form into a desired shape. The above-mentioned mold contains formation of different shapes and dimensions. The material ruptures at some of these formations, and is rated on a scale of 1-5 based on the maximum depth of draw where it ruptures.

Figure 9:
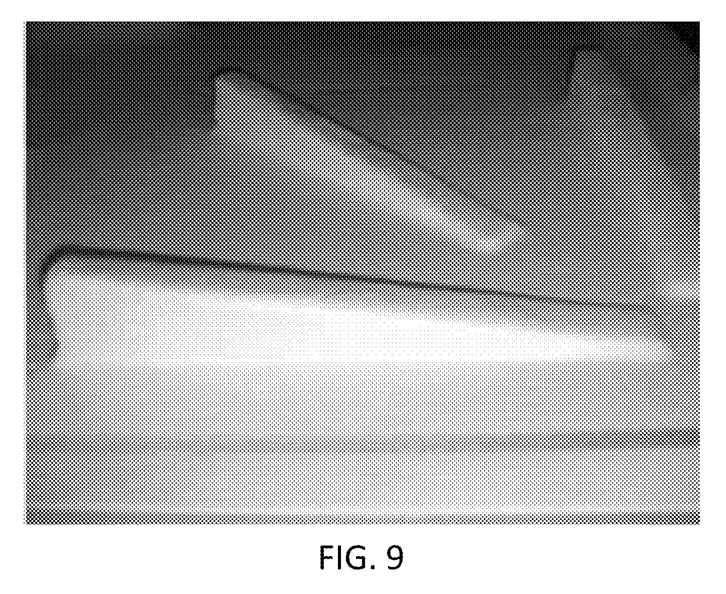
FIG. 9 is a photograph showing a ramp mold used in torture tool test of composite materials, in accordance with certain examples.
Figure 10:
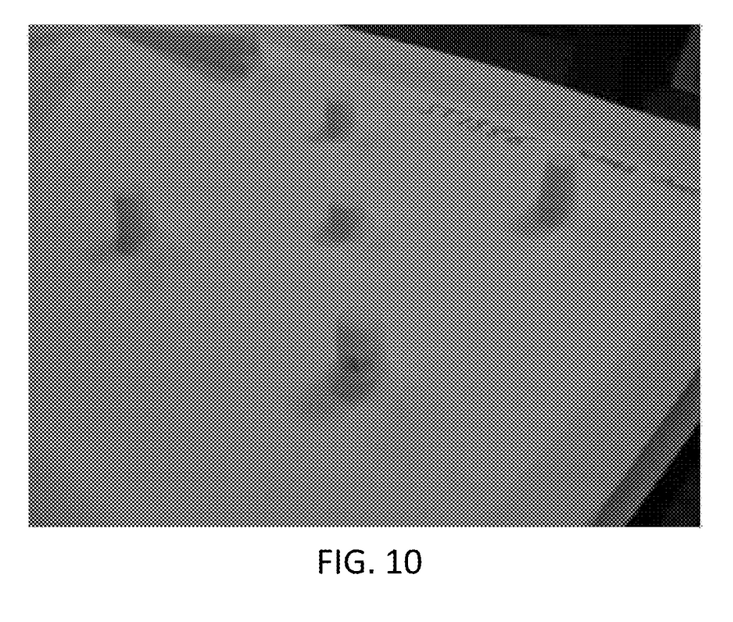
FIG. 10 is a photograph showing a cone mold used in torture tool test of composite materials, in accordance with certain examples.

Photographs of two molds suitable for use in the torture tool test method are shown in FIGS. 9 and 10. Referring to FIG. 9, the mold can be used to provide for wedge formation with increasing height. The distance of the point where the rupture happens is measured from the base of the wedge. The wedges can be, for example, about 1.5 inches wide by about 12 inches long and 2.5 inches high at their highest point. A longer distance indicates a deep-draw molding ability of the composite. Referring to FIG. 10, a mold comprising truncated cones or "cupcakes" is shown. The cones have variable heights but have about the same diameter at the base, e.g., 1 inch. The heights of the cones can be, for example, 0.5 inches, 1 inch, 1.5 inches, 2 inches and 2.5 inches. The structures can include a suitable taper angle, e.g., 5 degrees, if desired. The material is evaluated based on the highest formation where it ruptures. A higher formation indicates a deep-draw molding ability of the composite.

In certain embodiments, the materials described herein can be packaged in the form of a kit that includes a core material and a surface layer material, and the final bonding of the two materials together may be performed downstream by an end user. For example, an adhesive can be added to the core material by the end user followed by application of the surface layer and subsequent processing steps, e.g., lamination, molding or the like. In some embodiments, the kit can include a core material and a surface layer material effective to permit deep drawing of the final article. In some examples, the surface layer of the kit may comprise a basis weight of at least 65 g/m2 and an elongation at break of at least 20%. In other examples, the surface layer material can be effective to permit deep drawing of the article by at least 5 cm using a torture tool test method without breakthrough of the article. Illustrative surface layers materials for inclusion in the kit include fabrics, non-woven materials, films or the other surface layer materials described herein.

In certain examples, the articles described herein can be trimmed, cut, diced or otherwise shaped as desired. Such trimming, cutting and dicing may be performed prior to deep drawing of the article or after deep drawing of the article. In some embodiments, a single composite article can be used to provide multiple different deep draw composite parts, e.g., multi-cavity tooling can be performed to provide more than one final deep draw article from a single sheet of composite material.

In certain examples, one or more post-processing steps can be performed after deep drawing of the article. Such post-processing steps include, but are not limited to, trimming, HM bonding, sonic welding, IR welding, heat staking, vibration welding, perforating, punching, edge folding or other steps. If desired, the deep draw composite, or portions thereof, may be heated in certain areas to soften the composite in those areas and facilitate the processing of it.

In certain embodiments, the properties of final articles produced can be tested to determine if they meet desired physical properties. Suitable ASTM tests for measuring stiffness, flexural strength, tensile strength and the like will be readily selected by the person of ordinary skill in the art, given the benefit of this disclosure.

Certain specific examples are described below to illustrate further some of the novel aspects of the technology described herein.

Example 1

A composite material comprising a Superlite® mat core (700 g/m2 basis weight) and a non-woven skin (HOF G9/4200/70/K8 commercially available from HOF textiles (http://www.hoftextiles.com/)) bonded to the core was tested using the torture tool test method described herein. The non-woven skin had a basis weight of 70 and a fabric elongation (MD/CD) of 20/30. A 20 g/m2 scatter coat thermoplastic adhesive was used to bond the skin to the Superlite® core. The average minimum peel strength was measured to be 7.58 N using DIN419 family of tests dated Jul. 3, 1990.

Three sample sheets of the composite material were subjected to the torture tool test described herein by placing the sheets on the molds and molding the sheets to the molds. The composite passed the torture tool test if the average draw height was greater than 5 cm for the ramp mold (FIG. 9) and/or greater than about 3 cm for the cone mold (FIG. 10). All samples passed the torture tool test with the average draw height at failure being about 6 cm for the ramp mold, and the average draw height at failure for the cone mode being 3.81 cm.

Example 2

A composite material comprising a Superlite® mat core (700 g/m2 basis weight) and a non-woven skin (Freudenberg X-44 commercially available from Freudenberg Nonwovens (www.freudenberg-nw.com) bonded to the core was tested using the torture tool test method described herein. The non-woven skin had a basis weight of 80 and a fabric elongation (MD/CD) of 38/40. A 98 g/m2 polypropylene thermoplastic adhesive was used to bond the skin to the Superlite® core. The average minimum peel strength was measured to be 7.44 N using DIN419 dated Jul. 3, 1990.

Three sample sheets of the composite material were subjected to the torture tool test method described herein by placing the sheets on the molds and molding the sheets to the molds. The composite passed the torture tool test if the average draw height was greater than 5 cm for the ramp mold (FIG. 9) and/or greater than about 3 cm for the cone mold (FIG. 10). All samples passed the torture tool test with the average draw height at failure being about 6.11 cm for the ramp mold, and the average draw height at failure for the cone mode being 2.96 cm.

Example 3

A composite material similar to that used in Example 2 was produced except that no adhesive was used to bond the non-woven skin to the Superlite® core material. The average minimum peel strength was measured to be 0.65 N using DIN419 dated Jul. 3, 1990.

Three sample sheets of the composite material were subjected to the torture tool test method described herein by placing the sheets on the molds and molding the sheets to the molds. The composite passed the torture tool test if the average draw height was greater than 5 cm for the ramp mold (FIG. 9) and/or greater than about 3 cm for the cone mold (FIG. 10). All samples passed the wedge torture tool test with the average draw height at failure being about 5.31 cm for the ramp mold. All samples failed the cone torture test with the average draw height at failure for the cone mode being 2.54 cm. In addition, wrinkling and bridging of the skin material were observed.

Example 4

A composite material comprising a Superlite® mat core (700 g/m2 basis weight) and a non-woven skin (Freudenberg 76-60) bonded to the core was tested using the torture tool test method described herein. The non-woven skin had a basis weight of 60 and a fabric elongation (MD/CD) of 45/45. A 98 g/m2 polypropylene thermoplastic adhesive was used to bond the skin to the Superlite® core. The average minimum peel strength was measured to be 4.77 N using DIN419 dated Jul. 3, 1990.

Three sample sheets of the composite material were subjected to the torture tool test method described herein by placing the sheets on the molds and molding the sheets to the molds. The composite passed the torture tool test if the average draw height was greater than 5 cm for the ramp mold (FIG. 9) and/or greater than about 3 cm for the cone mold (FIG. 10). All samples failed the torture tool test with both molds with the average draw height at failure being about 4.69 cm for the ramp mold, and the average draw height at failure for the cone mode being 2.54 cm.

Example 5

A composite material similar to that used in Example 4 was produced except that no adhesive was used to bond the non-woven skin to the Superlite® core material. The average minimum peel strength was measured to be 0.58 N using DIN419 dated Jul. 3, 1990.

Three sample sheets of the composite material were subjected to the torture tool test method described herein by placing the sheets on the molds and molding the sheets to the molds. The composite passed the torture tool test if the average draw height was greater than 5 cm for the ramp mold (FIG. 9) and/or greater than about 3 cm for the cone mold (FIG. 10). All samples failed the ramp mold torture tool test with the average draw height at failure being about 4.17 cm for the ramp mold. All samples seemingly passed the cone torture test with the average draw height at failure for the cone mode being 3.81 cm, but substantial wrinkling and bridging of the composite were observed. In addition, the skin completely delaminated rendering it unsuitable for deep drawing.

Example 6

A composite material comprising a Superlite® mat core (1200 g/m2 basis weight) and a non-woven skin disposed on at least one side of the core can be produced. In one embodiment, the skin can be a needle punch non-woven material disposed on one side of the core.

Example 7

A composite material comprising a Superlite® mat core (1200 g/m2 basis weight) and a non-woven skin disposed on at least one side of the core can be produced. In one embodiment, the skin can be a need-punch non-woven material with a basis weight of about 70 g/m2 disposed on both sides of the core.

Example 8

A composite material comprising a Superlite® mat core (1000 g/m2 basis weight) and a non-woven skin disposed on at least one side of the core can be produced. In one embodiment, the skin can be a HOF G9/4200/70/K8 scrim disposed on one side of the core.

Example 9

A composite material comprising a Superlite® mat core (1000 g/m2 basis weight) and a non-woven skin disposed on at least one side of the core can be produced. In one embodiment, the skin can be a HOF G9/4200/70/K8 scrim disposed on one side of the core, and a 20 g/m2 spunbond material disposed on the other side of the core. Suitable spunbond materials are commercially available from many suppliers.

Example 10

A composite material comprising a Superlite® mat core (1000 g/m2 basis weight) and a non-woven skin disposed on at least one side of the core can be produced. In one embodiment, the skin can be a HOF G9/4200/70/K8 scrim disposed on both sides of the core.

Example 11

A composite material comprising a Superlite® mat core (1000 g/m2 basis weight) and a non-woven skin disposed on at least one side of the core can be produced. In one embodiment, the skin can be a HOF G9/4200/70/K8 scrim disposed on both sides of the core.

Example 12

A composite material comprising a Superlite® mat core (900 g/m2 basis weight) and a non-woven skin disposed on at least one side of the core can be produced. In one embodiment, the skin can be a HOF G9/4200/70/K8 scrim disposed on both sides of the core.

Example 13

A composite material comprising a Superlite® mat core (900 g/m2 basis weight) and a non-woven skin disposed on at least one side of the core can be produced. In one embodiment, the skin can be a HOF G9/4200/70/K8 scrim disposed on one side of the core.

Example 14

A composite material comprising a Superlite® mat core (900 g/m2 basis weight) and a non-woven skin disposed on at least one side of the core can be produced. In one embodiment, the skin can be a HOF G9/4200/70/K8 scrim disposed on both sides of the core.

Example 15

A composite material comprising a Superlite® mat core (1220 g/m2 basis weight) and a non-woven skin disposed on at least one side of the core can be produced. In one embodiment, the skin can be a HOF G9/4200/70/K8 scrim disposed on one side of the core.

Example 16

A composite material comprising a Superlite® mat core (1220 g/m2 basis weight) and a non-woven skin disposed on at least one side of the core can be produced. In one embodiment, the skin can be a HOF G9/4200/70/K8 scrim disposed on both sides of the core.

Example 17

A composite material comprising a Superlite® mat core (1200 g/m2 basis weight) and a non-woven skin disposed on at least one side of the core can be produced. In one embodiment, the skin can be a HOF G9/4200/70/K8 scrim disposed on one side of the core.

Example 18

A composite material comprising a Superlite® mat core (1200 g/m2 basis weight) and a non-woven skin disposed on at least one side of the core can be produced. In one embodiment, the skin can be a HOF G9/4200/70/K8 scrim disposed on both sides of the core.

Example 19

A composite material comprising a Superlite® mat core (900-1200 g/m2 basis weight) and a co-polymer blend disposed on one side of the core and a polypropylene material (225 g/m2) disposed on the other side of the core can be produced. In one embodiment, the polypropylene material can be perforated.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A composite comprising a fiber reinforced polymer core comprising a web of open cell structures formed by random crossing over of reinforcing fibers held together by a thermoplastic material, the composite material further comprising a porous non-woven skin material disposed on at least some portion of the fiber reinforced polymer core, in which the polymer core comprises a basis weight of 700 g/m$^2$, in which the porous non-woven skin material comprises a basis weight of 70 g/m$^2$, a fabric elongation (MD/CD) of 20/30, and an elongation at break of at least 20%, the composite further comprising a thermoplastic material adhesive layer between the porous non-woven skin material and the polymer core to bond the porous non-woven skin material to the polymer core, in which the composite can be drawn to a draw height of at least 5 cm using a ramp mold and drawn to a draw height of at least 3 cm using a cone mold without breakthrough of the composite.

2. The composite of claim 1, wherein the reinforcing fibers comprise fibers including a diameter greater than about 5 microns and a length from about 5 mm to about 200 mm.

3. The composite of claim 1, wherein the thermoplastic polymer resin is selected from the group consisting of a polyolefin, a thermoplastic polyolefin blend, a polyvinyl polymer, a butadiene polymer, an acrylic polymer, a polyamide, a polyester, a polycarbonate, a polyestercarbonate, a polystyrene, an acrylonitrylstyrene polymer, an acrylonitrile-butylacrylate-styrene polymer, a polyether imide, a polyphenylene ether, a polyphenylene oxide, a polyphenylenesulphide, a polyether, a polyetherketone, a polyacetal, a polyurethane, a polybenzimidazole, and copolymers and mixtures thereof.

4. The composite of claim 1, wherein the fibers of the core are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof.

5. The composite of claim 1, further comprising an additional skin material disposed on the polymer core.

6. A composite comprising a fiber reinforced polymer core comprising a web of open cell structures formed by random crossing over of reinforcing fibers held together by a thermoplastic material, the composite material further comprising a porous non-woven skin material disposed on at least some portion of the fiber reinforced polymer core, in which the polymer core comprises a basis weight of 700 g/m$^2$, and in which the porous non-woven skin material comprises a basis weight of 70 g/m$^2$, a fabric elongation (MD/CD) of 38/40 and an elongation at break of at least 20%, the composite further comprising a thermoplastic material adhesive layer between the porous non-woven skin material and the polymer core to bond the porous non-woven skin material to the polymer core, in which the composite can be drawn to a draw height of at least 5 cm using a ramp mold and can be drawn to a draw height of at least 3 cm using a cone mold without breakthrough of the composite.

7. The composite of claim 6, wherein the thermoplastic polymer resin is selected from the group consisting of a polyolefin, a thermoplastic polyolefin blend, a polyvinyl polymer, a butadiene polymer, an acrylic polymer, a polyamide, a polyester, a polycarbonate, a polyestercarbonate, a polystyrene, an acrylonitrylstyrene polymer, an acrylonitrile-butylacrylate-styrene polymer, a polyether imide, a polyphenylene ether, a polyphenylene oxide, a polyphenylenesulphide, a polyether, a polyetherketone, a polyacetal, a polyurethane, a polybenzimidazole, and copolymers and mixtures thereof.

8. The composite of claim 6, wherein the fibers of the core are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof.

9. The composite of claim 6, further comprising an additional skin material disposed on the polymer core.

10. A composite comprising a fiber reinforced polymer core comprising a web of open cell structures formed by random crossing over of reinforcing fibers held together by a thermoplastic material, the composite material further comprising a porous non-woven skin material disposed on at least some portion of the fiber reinforced polymer core, in which the polymer core comprises a basis weight of 700 g/m$^2$, in which the porous non-woven skin material comprises a basis weight of 70 g/m$^2$, a fabric elongation (MD/CD) of 45/45 and an elongation at break of at least 20%, the composite further comprising a thermoplastic material adhesive layer between the porous non-woven skin material and the polymer core to bond the porous non-woven skin material to the polymer core, in which the composite can be drawn to a draw height of at least 5 cm using a ramp mold and can be drawn to a draw height of at least 3 cm using a cone mold without breakthrough of the composite.

11. The composite of claim 10, wherein the thermoplastic polymer resin is selected from the group consisting of a polyolefin, a thermoplastic polyolefin blend, a polyvinyl polymer, a butadiene polymer, an acrylic polymer, a polyamide, a polyester, a polycarbonate, a polyestercarbonate, a polystyrene, an acrylonitrylstyrene polymer, an acrylonitrile-butylacrylate-styrene polymer, a polyether imide, a polyphenylene ether, a polyphenylene oxide, a polyphenylenesulphide, a polyether, a polyetherketone, a polyacetal, a polyurethane, a polybenzimidazole, and copolymers and mixtures thereof.

12. The composite of claim 10, wherein the fibers of the core are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof.

13. The composite of claim 10, further comprising an additional skin material disposed on the polymer core.

* * * * *